(12) United States Patent
Kudo

(10) Patent No.: US 9,061,549 B2
(45) Date of Patent: Jun. 23, 2015

(54) PNEUMATIC TIRE

(75) Inventor: Daisuke Kudo, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 342 days.

(21) Appl. No.: 13/559,668

(22) Filed: Jul. 27, 2012

(65) Prior Publication Data

US 2013/0068362 A1    Mar. 21, 2013

(30) Foreign Application Priority Data

Sep. 15, 2011  (JP) .................................. 2011-202146

(51) Int. Cl.
*B60C 13/00*    (2006.01)

(52) U.S. Cl.
CPC ....... *B60C 13/001* (2013.04); *Y10T 152/10495* (2015.01)

(58) Field of Classification Search
None
See application file for complete search history.

(56) References Cited

U.S. PATENT DOCUMENTS 5,263,525 A    11/1993    Yamashita

FOREIGN PATENT DOCUMENTS

| EP | 253557 | * | 1/1991 |
| EP | 490247 | * | 6/1992 |
| JP | 6-340208 | * | 12/1994 |
| JP | 2006-224704 | * | 8/2006 |

* cited by examiner

*Primary Examiner* — Justin Fischer

(74) *Attorney, Agent, or Firm* — Birch, Stewart, Kolasch & Birch, LLP

(57) ABSTRACT

A pneumatic tire comprises a sidewall portion provided in the outer surface thereof with an embossed mark. The embossed mark has a top surface axially outwardly away from the outer surface, a side surface extending from the outer surface to the top surface, an outside edge at which the side surface intersects with the top surface to form an outside corner, and an inside edge at which the side surface intersects with the outer surface to form an inside corner. The outside edge has a circumferential segment extending parallel with the tire circumferential direction, and the inside edge has a nearly-circumferential segment positioned oppositely to the circumferential segment and extending at an angle of from 0.5 to 2.5 degrees so that a warped plane is formed between the circumferential segment and nearly-circumferential segment.

5 Claims, 4 Drawing Sheets

PNEUMATIC TIRE

BACKGROUND OF THE INVENTION

The present invention relates to a pneumatic tire provided in the sidewall portion with an embossed mark, more particularly to a structure of the embossed mark capable of preventing occurrence of cracks.

In general, a pneumatic tire is as shown in FIG. 4, provided in the sidewall portion (b1) with embossed marks (a) in order to indicate various information on the tire and often for decorative purposes.

In recent years, on the other hand, in the field of passenger car tires, low profile pneumatic tires having very low aspect ratios such as 40% and 30% have been placed on the market.

In the case of pneumatic tires having relatively high aspect ratios, during running, the tire sidewall portions are repeatedly subjected to relatively large bending deformation in the ground contacting patch of the tire. Therefore, the embossed marks made from the sidewall rubber composition can endure such bending deformation.

In contrast, in the case of very low aspect ratio tires, the tire section height is very low and the radial dimension of the sidewall portions is very small. Accordingly, the sidewall portions are very hard to make bending deformation, and the sidewall portions in the ground contacting patch are subjected to large compressive deformation.

On the other hand, the embossed marks are protrude from the outer surface (b) of the tire sidewall portion (b1), therefore, the embossed marks are not subjected to compressive deformation, and a large shear stress occurs on the inside corner (f) between the outer surface (b) of the tire sidewall portion (b1) and the side surface (d) of the embossed mark (a) especially circumferentially extending side surface (g).

As a result, the very low aspect ratio tires suffer from cracks occurring at the inside corners of embossed marks such as the alphanumeric tire code which can not be omitted.

If the amount of protruding of the embossed mark is large like a block or rib formed in the tread portion, then concentration of the shear stress may be avoid by rounding the inside corner. But, the amount of protruding of the embossed mark is very small, therefore, if effectively rounded with a relatively large radius of curvature, then the border of the embossed mark becomes vague and the visibility and attractiveness of the embossed mark are greatly deteriorated. Thus, this technique can not be employed.

SUMMARY OF THE INVENTION

It is therefore, an object of the present invention to provide a pneumatic tire in which, in order to improve the durability of the tire, the probability of occurrence of cracks can be effectively reduced, without deteriorating the visibility and attractiveness of the embossed mark.

According to the present invention, a pneumatic tire comprises a sidewall portion provided in the outer surface thereof with an embossed mark, the embossed mark having a top surface axially outwardly away from the outer surface, a side surface extending from the outer surface to the top surface, an outside edge at which the side surface intersects with the top surface to form an outside corner, and an inside edge at which the side surface intersects with the outer surface to form an inside corner, wherein
the outside edge has a circumferential segment extending parallel with the tire circumferential direction, and the inside edge has a nearly-circumferential segment positioned oppositely to the circumferential segment and extending at a nonzero small angle α with respect to the tire circumferential direction so that a warped plane is formed between the circumferential segment and nearly-circumferential segment, whereby the side surface includes the warped plane.

Preferably, the angle α is set in a range of from 0.5 to 2.5 degrees.

when the outside edge has the two circumferential segments which are a radially inner circumferential segment and a radially outer circumferential segment, between which a part of the top surface is sandwiched, it is preferable that the angle α of the radially inner nearly-circumferential segment positioned oppositely to the radially inner circumferential segment is gradually increased toward one circumferential direction, and the small angle α of the radially outer nearly-circumferential segment positioned oppositely to the radially outer circumferential segment is gradually increased toward the other circumferential direction.

The radial height of the embossed mark is preferably set in a range of from 8 to 25% of the tire section height.

Therefore, the difference between the angles of the paired circumferential segment and nearly-circumferential segment is small and the common technique to round the inside corner is not employed. As a result, the appearance can not be disordered, and the attractiveness and visibility of the embossed mark are not deteriorated. Further it is possible to form an angled inside corner, therefore it is also possible to improve the attractiveness and visibility. Furthermore, although the angle α is small, as the nearly-circumferential segment inclines with respect to the tire circumferential direction, the stress can be dispersed and the probability of occurrence of cracks can be reduced. Further, since the warped plane disperses a possible bending stress, the stress on the nearly-circumferential segment can be reduced. Thus, the deterioration of the tire durability can be avoided.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various cold Inflation Pressures" table in TRA or the like.

DESCRIPTION OF THE PREFERRED EMBODIMENTS

Figure 1:
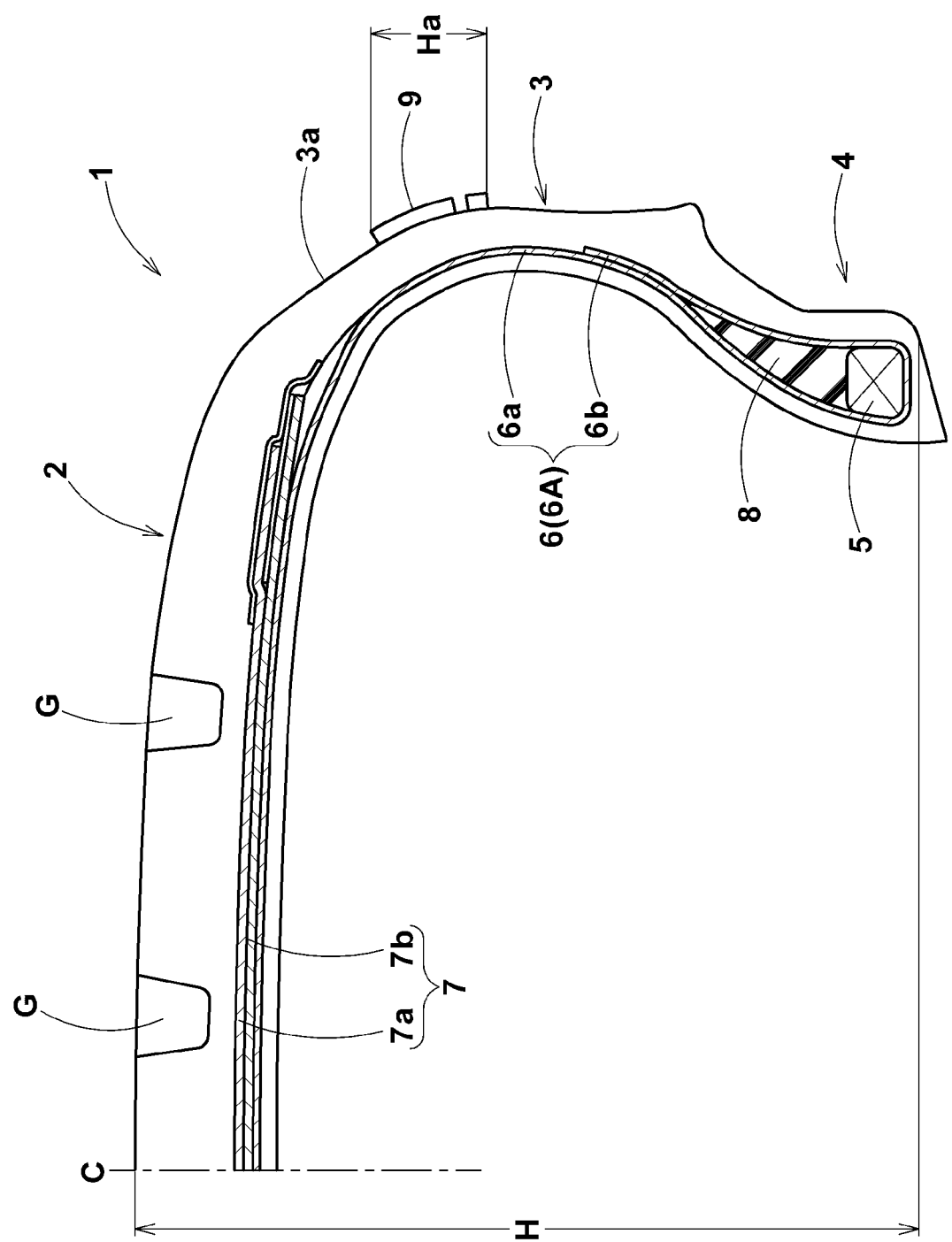
FIG. 1 is a schematic cross sectional view of a pneumatic tire as an embodiment of the present invention.

Embodiments of the present invention will now be described in detail in conjunction with the accompanying drawings.

The pneumatic tire 1 according to the present invention comprises a tread portion 2 provided with tread grooves G, a pair of axially spaced bead portions 4 each with a bead core 5 therein, a pair of sidewall portions 3 extending between the tread edges and the bead portions 4, a carcass 6 extending between the bead portions 4 through the tread portion 2 and sidewall portions 3, and a belt 7 disposed radially outside the carcass 6 in the tread portion 1.

The carcass 6 is composed of at least one ply 6A of cords extending between the bead portions 4 through the tread portion 2 and sidewall portions 3 and turned up around the bead core 5 in each of the bead portions 4 from the axially inside to the axially outside of the tire to form a pair of turnup portions 6b and a main portion 6a therebetween. In this embodiment, the carcass 6 is composed of a single ply 6A of cords arranged radially at an angle of 90 degrees with respect to the tire equator CO.

The belt 7 comprises a breaker and optionally a band (not shown). The breaker comprises at least two cross breaker plies 7A and 7B of high modulus cords laid at an angle of from 15 to 40 degrees with respect to the tire equator C. For the breaker cords, steel cords and/or high modulus organic fiber cords such as polyethylene naphtarete (PEN), polyethylene terephthalate (PET) and aromatic polyamide can be used. In this example, the breaker consists of the two cross breaker plies 7A and 7B. The band is composed of an organic cord or cords wound on the radially outside of the breaker at a small angle of at most about 5 degrees, for example almost zero degree with respect to the tire equator CO.

According to the present invention, the pneumatic tire 1 is provided in the outer surface 3a of at least one of the sidewall portions 3 with at least one embossed mark 9 protruding from the outer surface 3a, as shown in FIG. 1, to represent a character, symbol or diagram, partially or wholly. The amount of protruding of the embossed mark 9 from the outer surface 3a is at most 5 mm, preferably from 1 mm to 2 or 3 mm.

Figure 2:
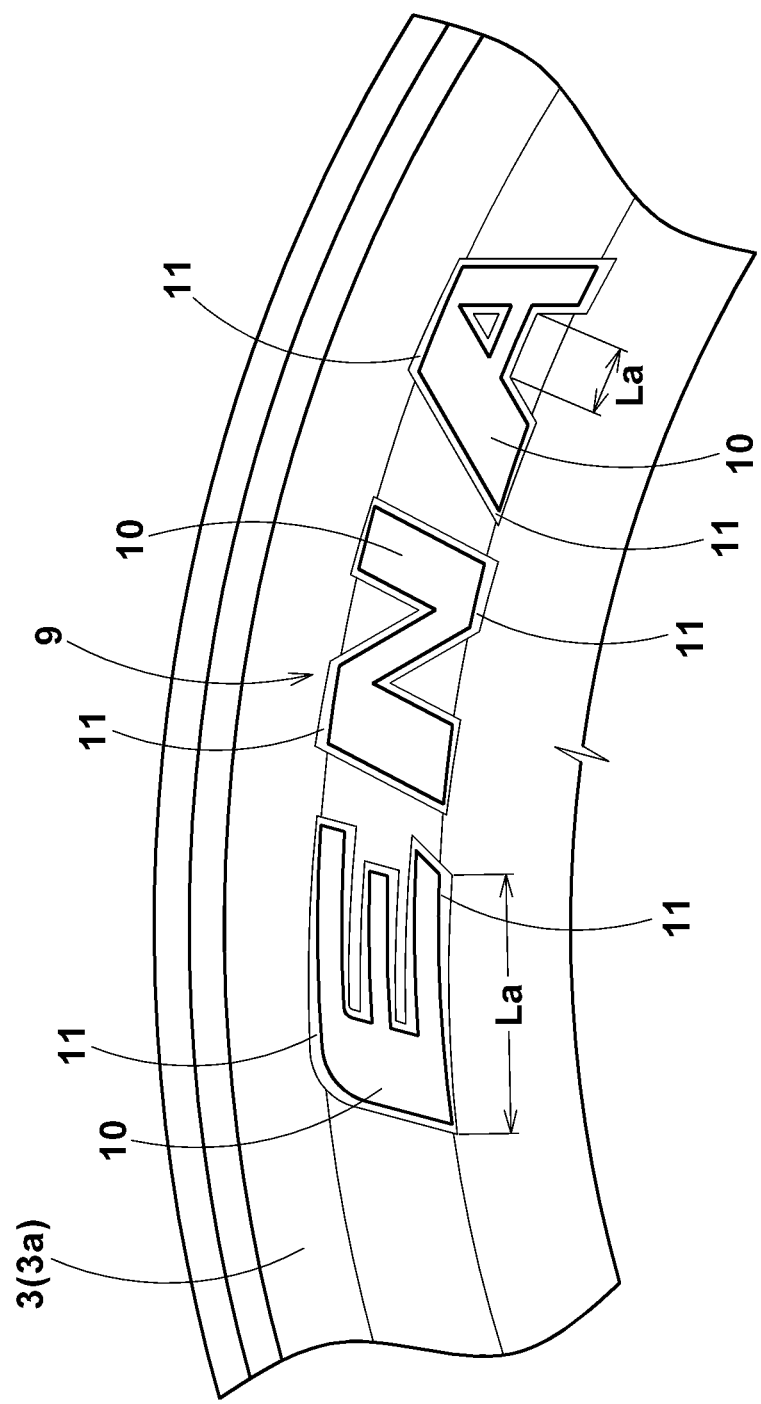
FIG. 2 is a partial side view of the pneumatic tire showing embossed marks.

In the example shown in FIG. 2, there are shown three embossed marks 9 which respectively represent characters "E", "N" and "A" wholly.

The embossed mark 9 is made of the sidewall rubber and formed through the molding of the tire.

The embossed mark 9 has a top surface 10 axially outwardly away from the outer surface 3a, a side surface 11 extending from the outer surface 3a to the top surface 10, an outside edge 12 at which the side surface 11 intersects with the top surface 10 to form an outside corner, and an inside edge 13 at which the side surface 11 intersects with the outer surface 3a to form an inside corner. On the outside corner and the inside corner, intentional rounding is not made, and the outside corner (12) and the inside corner (13) are angled.

The side surface 11 comprises a warped plane 14 formed between a circumferential segment 12a of the outside edge 12 and a nearly-circumferential segment 13a of the inside edge 13 positioned oppositely to the circumferential segment 12a.

The nearly-circumferential segment 13a extends at a non-zero small angle α with respect to the tire circumferential direction. The angle α is not less than 0.5 degrees, preferably not less than 1.0 degrees, and preferably not more than 2.5 degrees, more preferably not more than 2.0 degrees.

The circumferential segment 12a of the outside edge 12 extends parallel with the tire circumferential direction. But variations of up to 0.5 degrees may be permitted. Therefore, the angle β of the circumferential segment 12a with respect to the circumferential direction is less than 0.5 degrees.

In other words, a warped plane 14 is defined as having an outer edge (12a) which is substantially parallel with the tire circumferential direction along the entire length thereof, and an inner edge (13a) which is inclined at the small angle α with respect to the tire circumferential direction along the entire length thereof.

Figure 3:
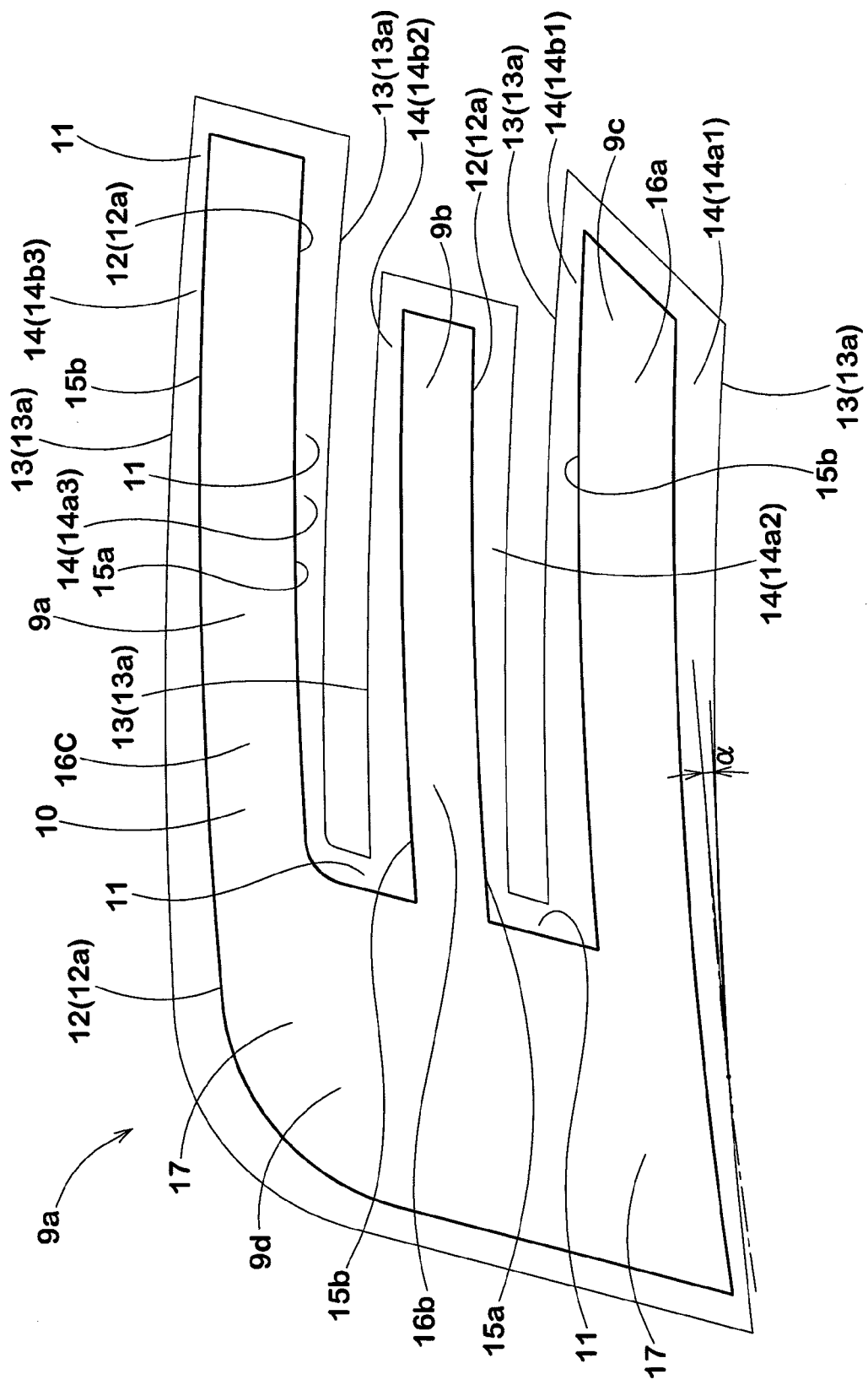
FIG. 3 is an enlarged view of one of the embossed marks.
Figure 4:
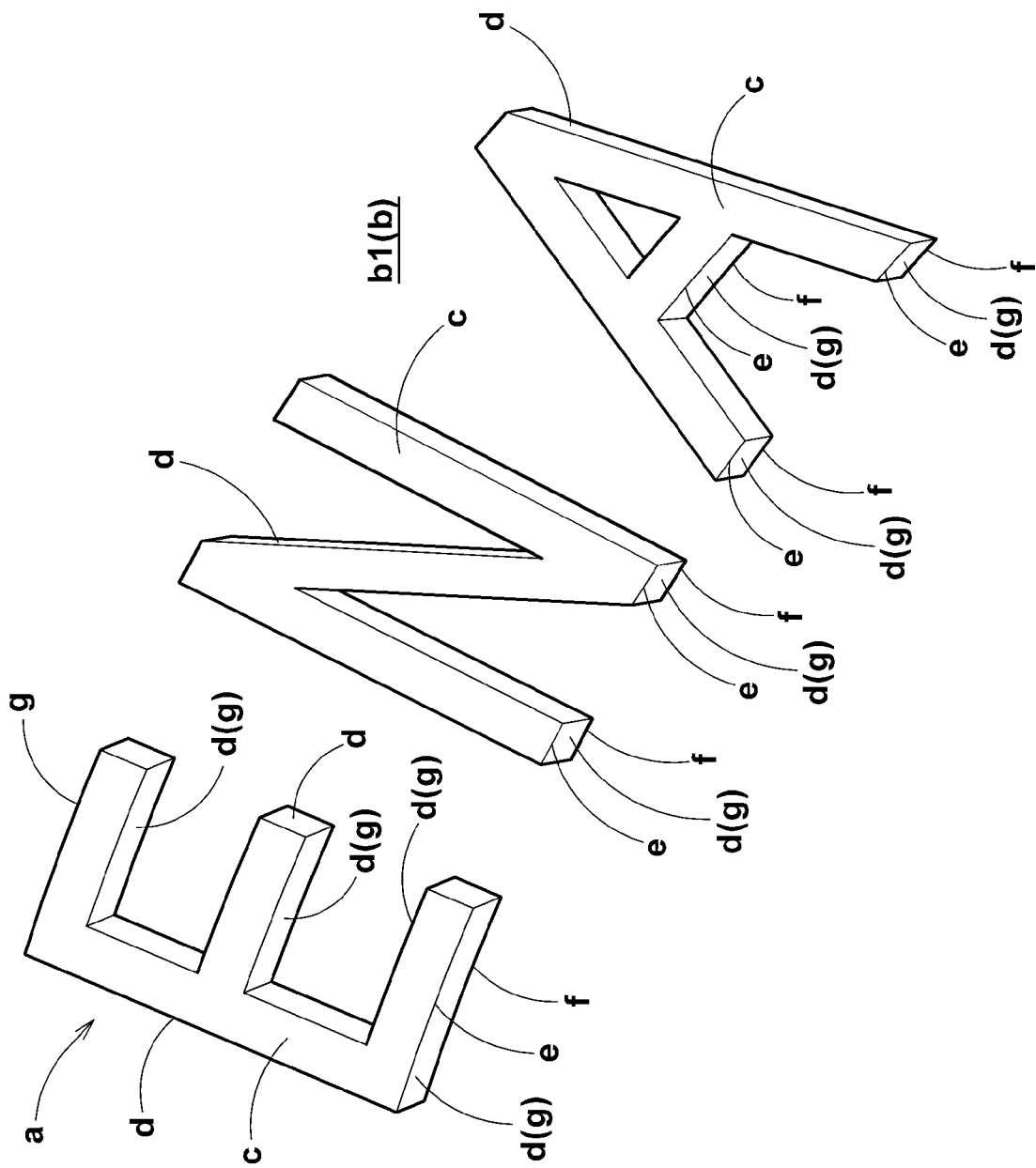
FIG. 4 is a perspective view for explaining a conventional embossed mark.

For example, in the case of the embossed mark 9 representing a character "E" shown in FIG. 3, the top surface 10 is made up of a single plane having the shape of "E", the side surface 11 is made up of twelve rectangular planes, the outside edge 12 is made up of twelve segments, and the inside edge 13 is made up of twelve segments.

The side surface 11 has six warped planes 14. In this example, the rest of the planes are flat, but may be warped planes 14.

In the case of alphabet, marks (characters) in which the total length of circumferentially extending lines (segments) is relatively long such as "A, B, D, E, F, G, H, L, P, R, T and z" are preferably provided with the warped planes 14.

If the angle α is more than 2.5 degrees, the attractiveness and visibility of the embossed mark 9 are liable to deteriorate. If the angle α is less than 0.5 degrees, it is difficult to reduce the stress concentration on the nearly-circumferential segment of the inside edge 13. Further, it becomes difficult to disperse the bending stress. Thus, the durability can not be improved.

The top surface 10 may have a circumferentially extending part 16 sandwiched between two circumferential segments 15a and 15b for example as shown in FIG. 3. In this case, it is preferable that, toward one circumferential direction, the angle α of the nearly-circumferential segment pairing with one circumferential segment 15a is gradually increased, but the angle α of the nearly-circumferential segment pairing with the other circumferential segment 15b is gradually decreased.

For example, in the case of FIG. 3, in the radially inner warped plane 14a, the angle α is gradually increased toward one circumferential direction (in FIG. 3, toward the left-hand side), whereas in the radially outer warped plane 14b on the opposite side of the circumferentially extending part 16, the angle α is gradually increased toward the other circumferential direction (in FIG. 3, toward the right-hand side).

In this specific example, the top surface 10 has the three radially-arranged circumferentially extending parts 16a-16c from which the radially inner and outer warped planes 14a1-14a3 and 14b1-14b3 extend. Therefore, with respect to each of the circumferentially extending parts 16a-16c, the above explained variable angles α are provided.

By providing the variable angles α, the rigidity of the circumferentially extending part 16 can be maintained. Further, the bending load from different directions is dispersed, and the stress on the nearly-circumferential segment can be further reduced. Accordingly, it is possible to effectively prevent the occurrence of cracks.

If the radial height Ha of the embossed mark 9 as shown in FIG. 1 is increased, the probability of occurrence of cracks increases. If the radial height Ha is decreased, the visibility of the embossed mark 9 is decreased. Therefore, the radial height Ha is preferably in a range of not less than 8%, more preferably not less than 10%, but not more than 25%, more preferably not more than 23% of the tire section height H. For the similar reasons, the circumferential length La of the inside edge 13 is preferably set in a range of not less than 8 mm, more preferably not less than 10 mm, but not more than 55 mm, more preferably not more than 53 mm.

The above-explained technique to provide a warped plane is preferably applied to embossed marks positioned radially outside the maximum cross sectional width position of the carcass 6. But, it is also possible to apply this technique to every embossed mark regardless of its radial position in the sidewall portion. Further, this technique can be applied to each of the circumferential segments in an embossed mark. But, it is also possible to selectively apply the technique to some of the circumferential segments.

COMPARISON TESTS

Pneumatic tires (tire size: 215/45R17, aspect ratio: 45%, rim size: 7.0JX17) for passenger cars were prepared and tested for the resistance to cracks and appearance as follows.

All of the test tires had the same internal structure shown in FIG. 1 and the same specifications except for the specifications shown in Table 1. The inventive technique to provide a warped plane was applied to all of the circumferential elements appearing in the embossed marks representing "ENASAVE EC202".

Resistance to Crack Test

Using a tire test drum having a diameter of 1.7 meters, the test tire was run for 30,000 km at a speed of 80 km/h under a tire load of 6.17 kN. Then, with the naked eye, the embossed marks representing "ENASAVE EC202" were checked for cracks at the inside edge and tearing-off the rubber and ranked as follows.

Rank A: no crack or maximum crack depth=<0.5 mm
Rank B: 0.5 mm<maximum crack depth=<1.0 mm
Rank C: 1.0 mm<maximum crack depth=<2.0 mm
Rank D: 2.0 mm<maximum crack depth
The results are shown in Table 1.

Appearance Test

Attractiveness and visibility of the embossed marks especially warped planes were evaluated into five ranks by testers. The higher rank number is better. The results are shown in Table 1.

applied to a pneumatic tire having an aspect ratio of 55% or less and a tire section height H of 120 mm or less.

REFERENCE SIGNS LIST 1 pneumatic tire
3 sidewall portion
3a outer surface of sidewall portion
9 embossed mark
10 top surface of embossed mark
11 side surface of embossed mark
12 outside edge (corner) of embossed mark
12a circumferential segment of outside edge
13 inside edge (corner) of embossed mark
13a nearly-circumferential segment of inside edge
14 warped plane between a pair of circumferential segment and nearly-circumferential segment

The invention claimed is:

1. A pneumatic tire comprising a sidewall portion provided in the outer surface thereof with an embossed mark,
    the embossed mark having a top surface axially outwardly away from the outer surface, a side surface extending from the outer surface to the top surface, an outside edge at which the side surface intersects with the top surface, and an inside edge at which the side surface intersects with the outer surface, wherein
    the outside edge has a circumferential segment extending parallel with the tire circumferential direction, and the inside edge has a nearly-circumferential segment positioned oppositely to the circumferential segment and extending at a nonzero small angle $\alpha$ with respect to the tire circumferential direction so that a warped plane is formed between the circumferential segment and nearly-circumferential segment, whereby the side surface includes the warped plane.

2. The pneumatic tire according to claim 1, wherein the angle $\alpha$ is in a range of from 0.5 to 2.5 degrees.

3. The pneumatic tire according to claim 1, wherein
    the circumferential segment of the outside edge comprises a radially inner circumferential segment and a radially outer circumferential segment, between which a part of the top surface is sandwiched,
    the nearly-circumferential segment of the inside edge comprises a radially inner nearly-circumferential segment positioned oppositely to the radially inner circumferen-

TABLE 1

| Tire | Ref. 1 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Embossed marks (Fig. No.) | 4 | 2&3 | 2&3 | 2&3 | 2&3 | 2&3 | 2&3 | 2&3 | 2&3 | 2&3 | 2&3 |
| angle $\alpha$ (deg.) | 0 | 1.0 | 0.5 | 2.0 | 1.5 | 2.5 | 3.0 | 1.0 | 1.0 | 1.0 | 1.0 |
| radial hight Ha (% of H) | 18 | 18 | 18 | 18 | 18 | 18 | 18 | 6 | 8 | 25 | 27 |
| Resistance to cracks | D | A | B | A | A | A | A | A | A | B | C |
| Appearance | 5 | 5 | 5 | 4 | 5 | 3 | 2 | 2 | 3 | 5 | 5 |

As apparent from the comparison test results, Embodiment tires Ex.1-Ex.10 were superior to comparative example Ref.1 in terms of overall evaluation about the resistance to cracks and appearance.

APPLICABILITY

The present invention can be applied to various kinds of pneumatic tires, regardless of the aspect ratio, but suitably tial segment and a radially outer nearly-circumferential segment positioned oppositely to the radially outer circumferential segment, and
the angle $\alpha$ of the radially inner nearly-circumferential segment positioned oppositely to the radially inner circumferential segment is gradually increased toward one circumferential direction, whereas the angle $\alpha$ of the radially outer nearly-circumferential segment positioned oppositely to the radially outer circumferential segment is gradually increased toward the other circumferential direction.

4. The pneumatic tire according to claim 1, wherein a radial height of the embossed mark is in a range of from 8 to 25% of a tire section height.

5. The pneumatic tire according to claim 2, wherein
the circumferential segment of the outside edge comprises a radially inner circumferential segment and a radially outer circumferential segment, between which a part of the top surface is sandwiched,
the nearly-circumferential segment of the inside edge comprises a radially inner nearly-circumferential segment positioned oppositely to the radially inner circumferential segment and a radially outer nearly-circumferential segment positioned oppositely to the radially outer circumferential segment, and
the angle $\alpha$ of the radially inner nearly-circumferential segment positioned oppositely to the radially inner circumferential segment is gradually increased toward one circumferential direction, whereas the angle $\alpha$ of the radially outer nearly-circumferential segment positioned oppositely to the radially outer circumferential segment is gradually increased toward the other circumferential direction.

* * * * *